UNITED STATES PATENT OFFICE.

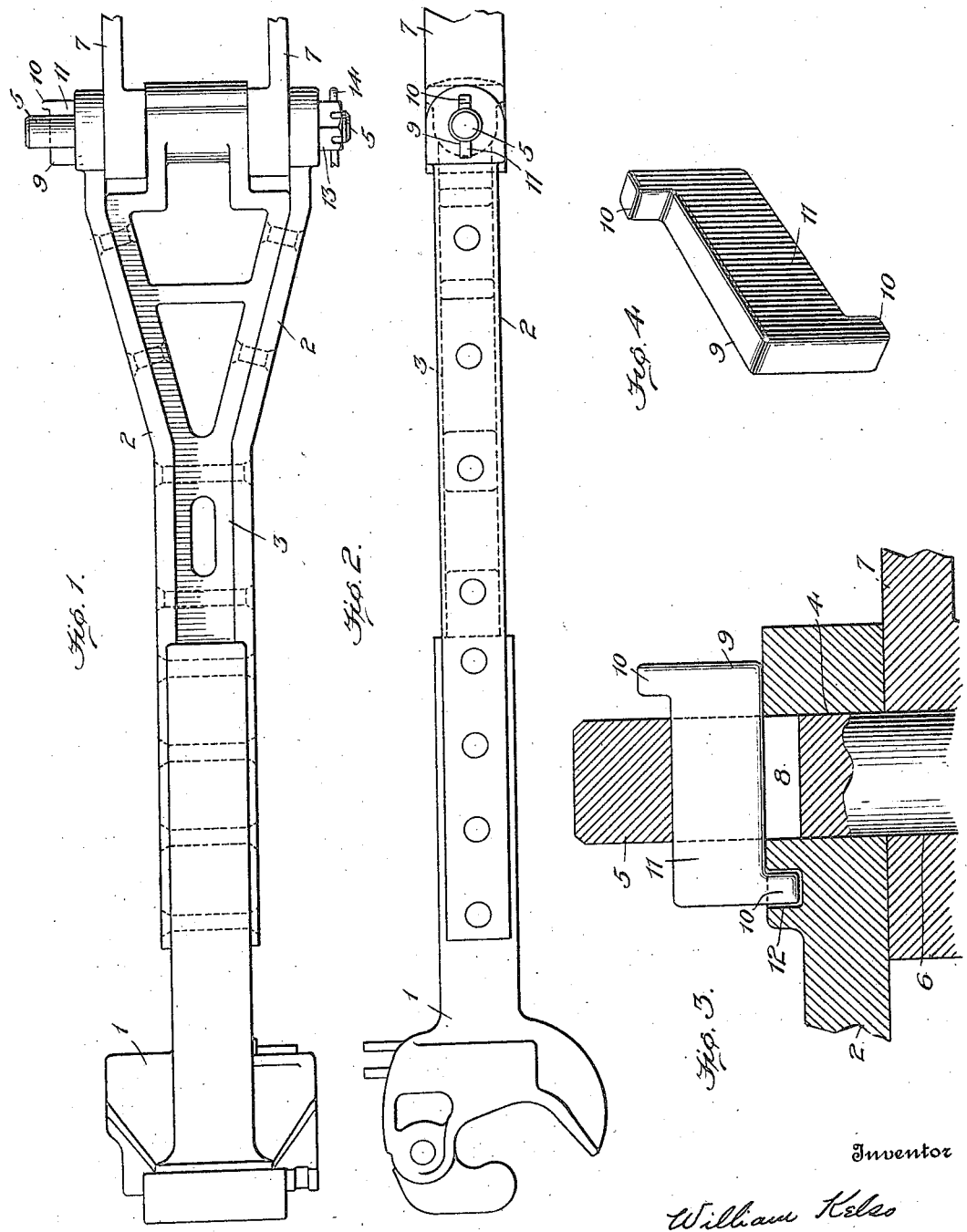

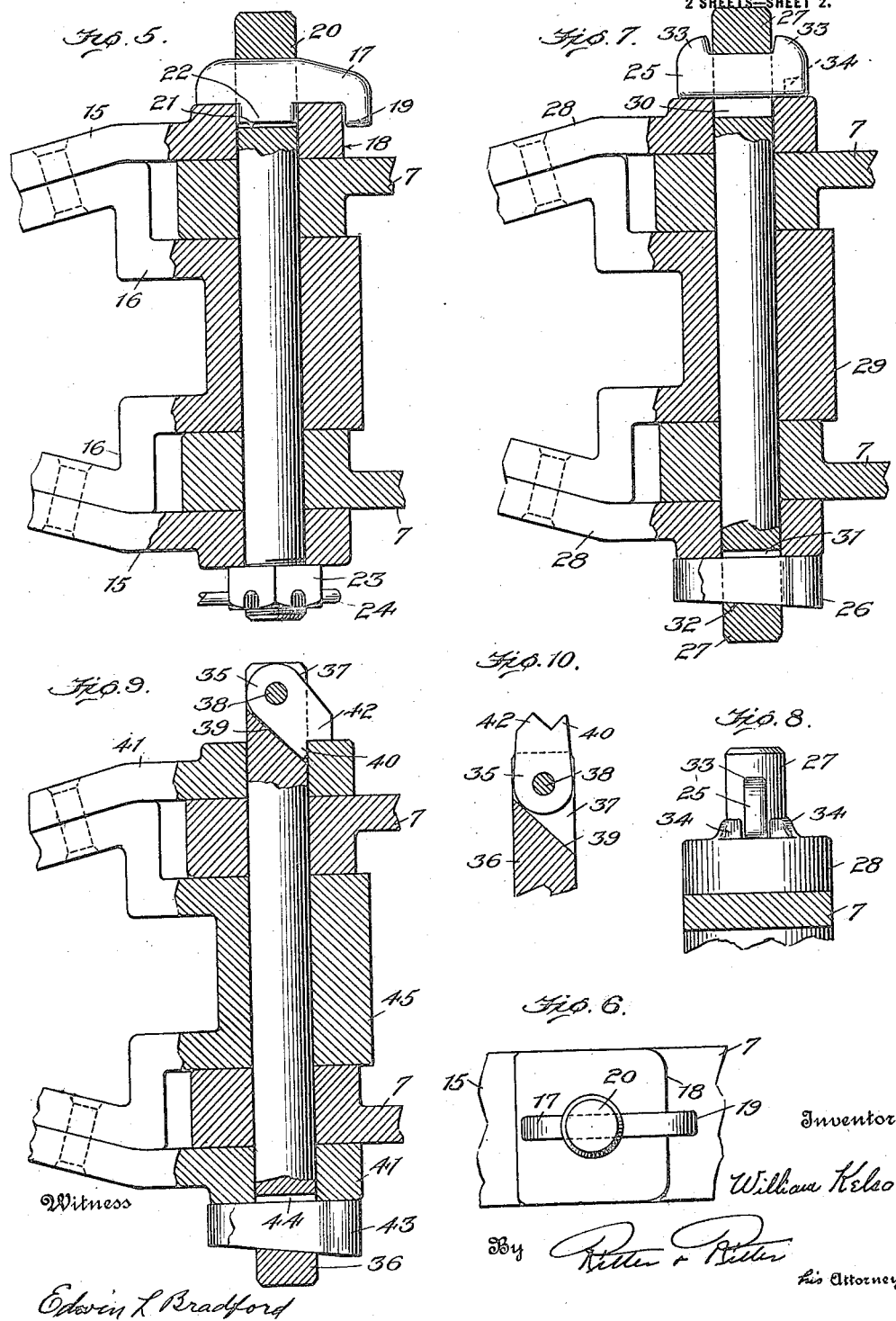

WILLIAM KELSO, OF PITTSBURGH, PENNSYLVANIA, ASSIGNOR TO THE McCONWAY & TORLEY COMPANY, OF PITTSBURGH, PENNSYLVANIA, A CORPORATION OF PENNSYLVANIA.

COUPLING AND YOKE CONNECTION FOR DRAFT RIGGING.

1,403,251.   Specification of Letters Patent.   Patented Jan. 10, 1922.

Application filed June 1, 1918. Serial No. 237,725.

*To all whom it may concern:*

Be it known that I, WILLIAM KELSO, a citizen of the United States, residing at Pittsburgh, in the county of Allegheny and State of Pennsylvania, have invented certain new and useful Improvements in Coupling and Yoke Connections for Draft Rigging; and I do hereby declare the following to be a full, clear, and exact description of the invention, such as will enable others skilled in the art to which it appertains to make and use the same.

My invention is primarily designed to afford a simple, efficient and easily released downwardly removable tail pin for pivotally connecting a car coupler to the yoke of a draft rigging, and is especially desirable for use with couplers employing the built-up type of stems since it serves to resist spreading or separation of the plates of such stems; but it is to be understood that the invention is not confined to that use.

Generally stated, the invention consists in employing, in combination with the members that are connected thereby, a fastening device for rigidly clamping said members together, said fastening device involving a headless pin extending through said members and having at its ends means for preventing its withdrawal, said means at one end of the pin comprising a detent adapted to be moved to a position permitting the pin to be withdrawn, and the means at the opposite end of the pin serving to take up slack or lost motion of the pin and to prevent the other said means from assuming a position permitting withdrawal of said pin, the pin being provided at one end with a slot which is adapted to receive said detent and which when the parts are in assembled position is disposed wholly above the adjacent contacting surfaces of the connected members, and the said detent being adapted normally to engage one of said connected members to thereby prevent accidental lateral movement of said detent with respect to said pin.

In the drawings illustrating the invention, the scope whereof is pointed out in the claims, Figure 1 is a side elevation of a car coupler and draft yoke connected by a downwardly removable tail pin constructed in accordance with my invention, only the forward portion of the yoke, which may be of well-known U-form, being illustrated.

Figure 2 is a plan view of the construction shown in Figure 1.

Figure 3 is a detail view, partly in elevation and partly in vertical section, showing the upper end of the tail pin devices and the adjacent portions of the coupler stem and yoke.

Figure 4 is a detail perspective view of the detent member employed in the form of my invention shown in Figures 1, 2 and 3.

Figure 5 is a view, partly in elevation and partly in vertical section, illustrating a modified form of the invention.

Figure 6 is a plan view of the construction shown in Figure 5.

Figure 7 is a view similar to Figure 5, but illustrating another form of the invention.

Figure 8 is a detail view, partly in elevation and partly in vertical section, of the construction illustrated in Figure 7.

Figure 9 is a view similar to Figures 5 and 7, but illustrating still another form of the invention.

Figure 10 is a detail view of the tail pin and detent employed in the construction shown in Figure 9, the detent being in the position allowing insertion or withdrawal of the pin.

The car coupler 1 shown in the drawings is of the type having a composite or built-up stem comprising upper and lower plates or bars 2 between which a filler or spacing member 3 is securely riveted. The rear end of each plate 2 is suitably perforated, as at 4, to receive a downwardly removable pin 5 which also extends through corresponding perforations 6 in the forward ends of the arms 7 of the draft yoke. The pin 5 is preferably of cylindrical form, thereby serving to pivotally connect the coupler and yoke.

Near its upper end the pin 5 is formed with a recess or slot 8 to receive a removable detent 9, the vertical height of the slot 8 being little greater than the width or vertical height of removable detent 9 when the parts are in their normal or operative relation. This removable detent 9, when in assembled relation, prevents the pin from being withdrawn downwardly. The slot or recess 8 terminates above the adjacent contacting surfaces of the upper plate 2 of the coupler stem and the upper arm 7 of the draft yoke, thereby maintaining the full shearing value of the pin 5 at this point of strain and obviating any closing of the slot which would interfere with the proper operation of the detent 9. The detent 9 is preferably provided with two oppositely extending locking projections 10 located at opposite ends of its body portion 11. As shown in Figure 3 either of these projections 10 is adapted to enter a socket or recess 12 in the adjacent plate 2 of the coupler stem, thus performing the dual function of preventing accidental displacement of the detent and preventing turning of the tail pin 5. By providing two projections 10 the detent 9 is rendered reversible and all possibility of improperly applying it is overcome. Moreover, in the event of breaking one of the projections the detent may still be used by merely reversing it to bring the other projection into service.

At its lower end the pin 5 bears means serving to prevent its upward withdrawal and to take up slack or lost motion of the pin. This means may conveniently consist of a castle nut 13 secured in adjusted position by a cotter 14 passing through the pin 5, as shown in Figure 1; but other figures of the drawings (see Figures 7 and 9) illustrate this means as a tapered or beveled split key.

In order to withdraw the tail pin 5 from below it is necessary to accord it sufficient endwise movement to release the locking lug 10 of the detent 9 from the socket 12 in the upper plate 2 of the coupler stem. This may be accomplished by removing the cotter 14 and unscrewing the nut 13.

In the form of the invention illustrated in Figures 5 and 6 the upper and lower plates or bars 15 of the coupler stem are rigidly riveted to an interposed spacer member 16, these parts being like the corresponding parts already described except that the upper plate 15 is not provided with the socket 12 to receive a projection on the detent, but in lieu thereof for the purpose of preventing turning of the detent 17 preferably has its rear end substantially square or made straight transversely, as at 18, so as overlappingly to engage the downwardly extending projection 19 at one end of the detent 17.

The tail pin 20 passing through the plates 15, spacer 16 and arms 7 of the draft yoke is formed at its upper end with a recess 21 through which the detent 17 extends, thus preventing downward withdrawal of the pin while the detent is in assembled position. On its under side the detent 17 is provided between its ends with a projection 22 adapted to extend into the tail pin hole in the upper plate 15 of the coupler stem, thus preventing the detent from accidentally releasing the tail pin.

To prevent upward withdrawal of the tail pin 20, as well as to take up slack or lengthwise movement of the pin as desired, a castle nut 23 and cotter 24 may be employed, as heretofore described.

In the construction shown in Figures 7 and 8 a somewhat different form of detent 25 is employed and a tapered or beveled split key 26 is used to restrain upward withdrawal and to take up longitudinal slack of the tail pin 27. The tail pin, which passes through the upper and lower plates 28 and spacer member 29 of the coupler and through the arms 7 of the draft yoke, is provided at its upper end with a slot or recess 30 to receive the detent 25 and at its lower end with a recess 31 for the tapered key 26, the lower wall of the recess 31 being inclined, as at 32, to correspond to the taper of the split key. Escape of the detent 25 from assembled position is prevented by the engagement of its upwardly extending projections 33 with the sides of the tail pin. To prevent the detent from turning the upper plate or bar 28 of the coupler stem may be provided with spaced lugs 34 adapted to receive one end of the detent 25 between them when the parts are in assembled position. When the tail pin 27 is to be removed from below the tapered key 26 is withdrawn to allow the tail pin to have the upward longitudinal movement necessary for releasing the detent 25. Upon freeing the tail pin from the restraint of the detent, the pin may be withdrawn downwardly.

Figures 9 and 10 show a form of the invention in which the detent 35 for restraining downward removal of the tail pin 36 is pivotally mounted in an upwardly opening slot or recess 37 formed in the upper end of the tail pin. The pivot pin 38 passing through the detent and tail pin is preferably a driving fit and may if desired have its ends slightly upset.

The lower wall 39 of the recess 37 is preferably adapted to engage the under side of the detent 35 and prevent it swinging downwardly beyond the position it occupies relative to the tail pin when in assembled position. This facilitates assembly of the mechanism. Accidental upward rotation of the detent to the position (see Figure 10) permitting downward withdrawal of the tail pin 36 is prevented by a projection 40 on the detent engaging the upper plate 41 of the coupler stem within the tail pin opening thereof. When the parts are in assembled position the outer end portion 42 of the detent engages the upper plate of the coupler stem adjacent to the tail pin opening, thus preventing the tail pin from being removed downwardly. A tapered split key 43 passing through a slot 44 in the lower end of the tail pin, as heretofore described in respect of the similar construction illustrated in Figure 7, may be used to prevent upward removal of the tail pin 36 and to adjust and control its longitudinal movement. As shown, the tail pin extends through the arms 7 of the draft yoke and through the upper and lower plates 41 and spacer member 45 of the coupler stem, thus pivotally connecting the coupler and yoke.

The tail pin 36 may be removed from below to permit repair or renewal of the coupler by withdrawing the tapered key 43, then moving the tail pin upwardly until the detent 35 can be shifted to released position, as shown in Figure 10, and then withdrawing the pin downwardly while the detent is in released position.

I claim:

1. The combination with the members connected thereby, of a fastening device comprising a pin extending through said members and provided at its upper end with a recess which when the parts are in assembled position is disposed wholly above the adjacent contacting surfaces of said connected members, and means adapted normally to prevent endwise movement of said pin in either direction, said means involving devices at opposite ends of said pin, one of said devices being removable and being adapted to be moved to a position permitting withdrawal of said pin only after the said device at the opposite end of the pin has been actuated to disengage it from one of said connected members.

2. The combination with the members connected thereby, of a fastening device involving a pin extending through said members and provided at its upper end with a recess which when the parts are in assembled position is disposed wholly above the adjacent contacting surfaces of said connecting members, detachable means at one end of said pin for preventing its removal in one direction, and means at the other end of said pin for preventing its removal in the opposite direction, said last named means being movable transversely with respect to said pin to permit withdrawal of the latter and being adapted to prevent rotation of said pin with respect to one of said connected members and being movable to pin releasing position only after movement of said detachable means at the opposite end of said pin.

3. The combination with the members connected thereby, of a fastening device involving a pin extending through said members, said pin having a recess at one end, a detachable detent normally mounted in said recess and projecting laterally beyond said pin to engage one of said connected members and thereby prevent withdrawal of the pin in one direction, said detent having a portion adapted normally to engage one of said connected members to prevent lateral movement of said detent with respect to said pin, and means at the other end of said pin for adjustably controlling the movement of said pin in the opposite direction, said last named means being adapted to engage one of said connected members and permitting lengthwise movement of said pin only when disengaged from said connected member.

4. The combination with the members connected thereby, of a fastening device involving a pin extending through said members and having a recess at one end, a removable reversible detent extending into said recess and normally preventing endwise movement of said pin in one direction, and means at the opposite end of said pin for normally maintaining said detent in assembled position in said recess, said detent having a body portion and projections extending in opposite directions from said body.

In testimony whereof I affix my signature.

WILLIAM KELSO.